H. W. ROGERS.
SYSTEM OF MOTOR CONTROL.
APPLICATION FILED MAY 21, 1920.

1,411,586.

Patented Apr. 4, 1922.

Inventor:
Harold W. Rogers,
by
His Attorney.

UNITED STATES PATENT OFFICE.

HAROLD W. ROGERS, OF SCHENECTADY, NEW YORK, ASSIGNOR TO GENERAL ELECTRIC COMPANY, A CORPORATION OF NEW YORK.

SYSTEM OF MOTOR CONTROL.

1,411,586.      Specification of Letters Patent.      Patented Apr. 4, 1922.

Application filed May 21, 1920. Serial No. 383,317.

*To all whom it may concern:*

Be it known that I, HAROLD W. ROGERS, a citizen of the United States, residing at Schenectady, in the county of Schenectady, State of New York, have invented certain new and useful Improvements in Systems of Motor Control, of which the following is a specification.

My invention relates to improvements in systems of motor control, and in particular to systems of motor control of the Ward-Leonard type. In systems of motor control such as are now well understood in the art as the "Ward-Leonard" type, in which a driving motor is supplied with current from a dynamo electric source, and the variation in the speed of the motor is obtained by varying the potential of the dynamo electric source and the excitation of the motor, any decrease in the load on the motor is very likely to cause an increase in the motor speed. This is due to the fact that a decrease in the load on the motor reduces the current taken from the dynamo electric source and thus increases the effective voltage of the dynamo electric source, and also from the fact that the inherent regulation of the motor is such that a decrease in load will cause an increase in speed unless compensated for in some way.

One of the objects of my invention is to provide an arrangement of the Ward-Leonard type in which a variation of the load on the motor does not cause a variation in the motor speed. The speed of the motor is thereby maintained substantially constant. Another object of my invention is to provide an arrangement of the type indicated in which the speed of the motor may be varied over a considerable range, and any desired definite speed of the motor may be maintained substantially constant despite variations in the load on the motor. My invention has a particular application in the electric drive for paper machines, although it will be obvious to those skilled in the art that my invention is by no means limited to its application in the drive of this particular type of machine.

Figure 1:
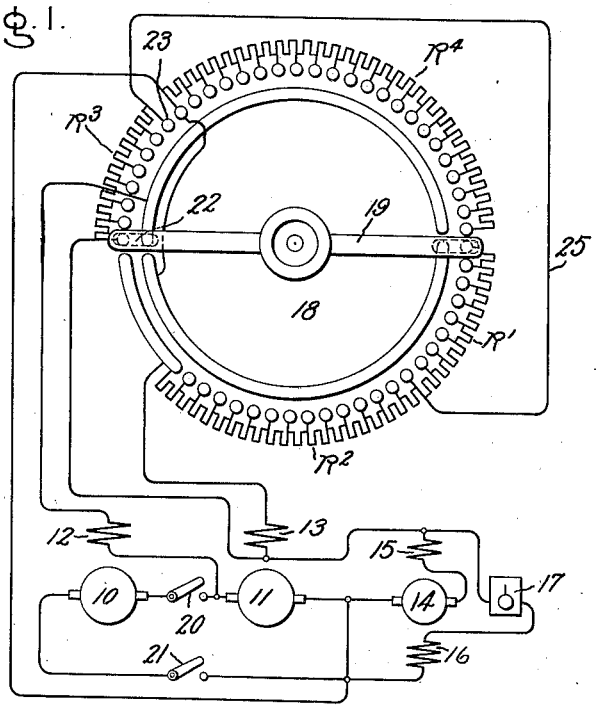
Figure 2:
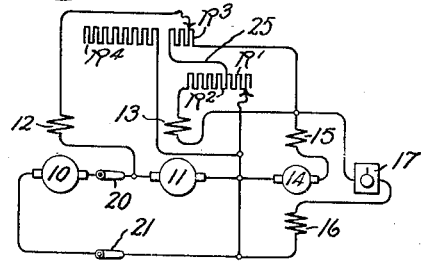

For a better understanding of my invention, reference is had to the accompanying drawing wherein I have illustrated my invention in simplified diagrams, and in which Fig. 1 is a control diagram with the various parts in position to start the motor, the armature of the motor being disconnected from the dynamo electric source; and Figs. 2, 3, 4, and 5 are simplified diagrams illustrating the manner in which the speed of the motor is varied and the arrangement whereby the speed of the motor is maintained substantially constant at any predetermined speed.

Referring to the drawings, the armature 10 of the electric motor, the speed of which is to be controlled, is adapted to be supplied with current directly from the armature 11 of a dynamo electric source. The motor is provided with a separately excited field winding 12 and the dynamo electric source or generator is provided with a separately excited field winding 13. The generator is adapted to be driven at a substantially constant speed in any suitable manner, and an exciter for the field windings of the motor and generator is adapted to be driven at substantially the same speed as the generator or synchronously with the generator, or in any suitable manner. This exciter comprises an armature 14, a series field 15, and a shunt field 16, the excitation of which may be varied by means of the rheostat 17.

A rheostat 18 is provided for simultaneously varying the resistance of the field circuits of the motor and the generator. This rheostat comprises a manually operated contact making dial switch 19, resistors, and contact making segments and contacts. The right-hand end of this dial switch is provided for varying the resistors $R^1$ and $R^2$ in the field circuit of the generator, and the left-hand end is adapted to vary the resistors $R^3$ and $R^4$ in the field circuit of the motor. The rheostat 18 is so arranged that the resistance of the field circuits of the motor and the generator are simultaneously and inversely varied in response to a movement of the dial switch; that is, with the parts in the position shown in Fig. 1, a clockwise movement of the dial switch will insert resistance in the field circuit of the motor and decrease the resistance in the field circuit of the generator, and a return movement will produce the opposite effect. The arrangement is such that the motor field is first connected across the generator and exciter armatures and finally connected across the generator armature without opening either the motor field circuit or the generator field circuit.

As thus constructed and arranged, and with the parts in the position shown in Fig. 1, let it be assumed that the generator and exciter are being driven at substantially constant speed. The voltage of the generator will be at a relatively low value because of the fact that all of the resistors $R^1$ and $R^2$ are included in circuit with the generator field. The rheostat 17, in circuit with the shunt winding 16 of the exciter, will be varied if necessary to cause the voltage of the exciter to be any value desired. After once adjusted, the voltage of the exciter will be maintained substantially constant, by reason of the fact that the exciter is compound wound, and the relation between the series winding 15 and the shunt winding 16 is such that the voltage of the exciter will be substantially constant over a predetermined range despite variations in the load on the exciter.

In order to start the motor, the disconnecting switches 20 and 21 will be closed, thereby connecting the motor armature 10 so as to be directly supplied with current from the armature 11 of the generator. The dial switch 19 will then be turned clockwise and the connections will then be shown in simplified diagram in Fig. 2. It will be observed that practically all of the resistors $R^1$ and $R^2$ are included in the field circuit of the generator, and that practically none of the resistor $R^3$ is included in circuit with the field 12 of the motor. It will also be observed that the field of the generator is supplied directly with the constant potential source (the exciter), and that the field 12 of the motor is supplied with current at a potential which is the sum of the potential developed by the exciter and by the armature 11 of the generator, minus the voltage drop across the portion of the resistor $R^3$ included in circuit with the motor field. As the dial switch 19 is moved in a clockwise direction, the effective resistance of $R^1$ is decreased and the effective resistance of $R^3$ is increased. Decreasing the resistance of $R^1$ will increase the excitation of the generator, thereby increasing the voltage, and in turn increasing the speed of the motor. The resistor $R^3$ is provided for maintaining a substantially constant field current in the motor; that is, the increase in the voltage of the generator is substantially compensated for by the resistance of $R^3$ which is included in the field circuit of the motor. Since the field of the motor is maintained substantially constant, the variation in the motor speed is obtained directly in response to the variation in the potential of the generator. The motor will be increased in speed directly as the voltage of the generator increases, until the dial switch has been moved to a certain position, as will be hereinafter fully explained. It will be observed, however, that a decrease in the load on the motor will not effect an increase in the motor speed, since the excitation of the motor is varied directly in accordance with any variation in voltage of the generator due to a varying load. A decrease in the load of the motor will cause the generator voltage to be increased and simultaneously the field excitation of the motor to be increased, so that the speed of the motor is maintained substantially constant despite variations in the load.

Figure 3:
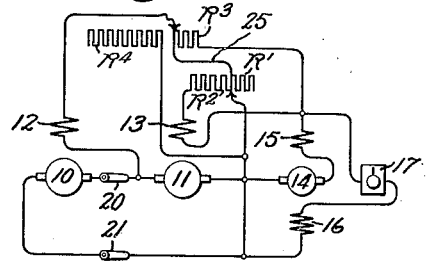
Figure 4:
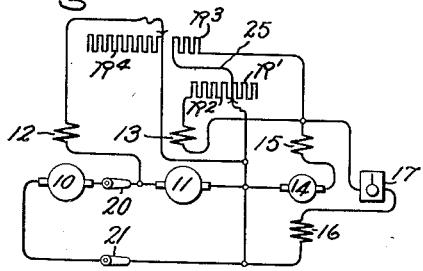
Figure 5:
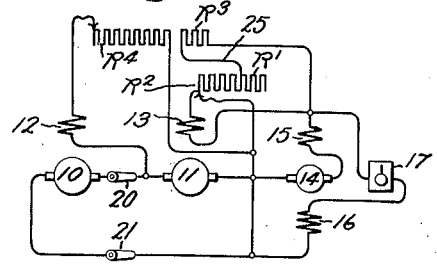

When the dial switch has been turned clockwise so that a further movement causes the contact 22 to make engagement with the contact button 23, the parts will be in the position shown diagrammatically in Fig. 3. All of the resistor $R^1$ has been cut out of the generator field and all of the resistor $R^3$ has been inserted in the field circuit of the motor. When the dial switch is turned further in a clockwise direction, connection to the resistor $R^3$ is opened and the connection to the resistor $R^4$ is made. It will be observed that after the dial switch has been moved so as to break engagement with the contact button 23, the field of the motor is connected directly across the armature 11 of the generator. The connections are now as shown in Fig. 4, and it will be observed that by reason of the provision of the connection 25 the transition from supplying the motor field at a potential which is the sum of the exciter and generator potentials to the energization of the motor field directly from the generator armature is made without opening either the motor field circuit or the generator field circuit. As the dial switch is moved further in a clockwise direction, more and more of the resistor $R^4$ is included in the field circuit of the motor to maintain a substantially constant motor field excitation, and the effective resistance of $R^2$ is simultaneously decreased until all of the resistor $R^2$ is cut out of the generator field circuit. The final speed variation of the motor is obtained entirely by varying the resistor $R^4$. It will be observed that at each of the positions of the rheostat 18, the field of the motor is excited in response to the voltage of the generator, so that the variation in the potential of the generator in response to a variation of the load on the motor will effect a simultaneous variation in the field strength of the motor so as to maintain the motor speed substantially constant despite variations in the load on the motor. It will also be observed that a very large number of definite speed points may be had for the motor, and that at each of the points the speed of the motor will be maintained substantially constant despite variations in the load. A further advantage is that at starting and for low speed running the motor field is energized at a potential which is substantially the sum of the exciter and generator potentials, thereby giving a strong motor field for starting and low speed running, and then the motor field is energized directly from the generator so as to obtain a more sensitive regulation of the motor field as the generator voltage is varied. The resistors and connections provide means whereby the motor field excitation is maintained substantially constant throughout the speed range so that the desired variations in the motor speed are obtained substantially directly with the variations of the generator voltage, and the arrangement is such that any desired definite speed will be maintained substantially constant despite variations in the load on the motor.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. The method of controlling an electric motor having its armature supplied with current from a dynamo electric source, the field of said dynamo electric source being excited from a source of substantially constant potential, and the field of the motor being connected across the dynamo electric source and the source of constant potential, which comprises varying the speed of the motor by maintaining substantially constant the excitation of the motor and varying the excitation of the dynamo electric source.

2. The method of controlling an electric motor having its armature supplied with current from a dynamo electric source, the field of said dynamo electric source being excited from a source of substantially constant potential, and the field of the motor being connected across the dynamo electric source and the source of constant potential, which comprises varying the speed of the motor by varying inversely the resistances of the field circuits of the dynamo electric source and of the motor.

3. The method of controlling an electric motor having its armature supplied with current from a dynamo electric source, the field of said dynamo electric source being excited from a source of substantially constant potential, which comprises connecting the field of the motor across the dynamo electric source and the constant potential source in series, and then connecting the motor field directly across the dynamo electric source.

4. The method of controlling an electric motor having its armature supplied with current from a dynamo electric source, the field of said dynamo electric source being excited from a source of substantially constant potential, which comprises connecting the field of the motor across the dynamo electric source and the constant potential source in series, and then connecting the motor field directly across the dynamo electric source with the supply of energy to the motor field maintained during the transition.

5. The method of controlling an electric motor having its armature supplied with current from a dynamo electric source, the field of said dynamo electric source being excited from a source of substantially constant potential, and the field of the motor being connected across the dynamo electric source and the source of constant potential, which comprises connecting the motor field directly across the dynamo electric source with the supply of energy to the motor field maintained during the transition, and varying the motor speed by varying the excitation of the generator and maintaining the excitation of the motor substantially constant.

6. The method of controlling an electric motor having its armature supplied with current from a dynamo electric source, the field of said dynamo electric source being excited from a source of substantially constant potential, and the field of the motor being connected across the dynamo electric source, which comprises inversely varying the resistances of the field circuits of the generator and motor.

7. A system of motor control, comprising a dynamo electric generator driven at a substantially constant speed, a motor whose armature is energized by the generator, a separate source of current for energizing the generator field, connections whereby the motor field is energized from the separate source and the generator connected in series and then energized from the generator alone, and means for varying inversely the resistances of the motor and generator field circuits.

8. A system of motor control, comprising a dynamo electric generator, a motor whose armature is energized by the generator, a separate source of current for energizing the generator field, and connections whereby the motor field is energized from the said separate source and the said generator connected in series.

9. The combination in a system of motor control of a dynamo electric generator driven at a substantially constant speed, a motor whose armature and field are energized by the generator, a separate substantially constant potential source of current for energizing the generator field, and a rheostat for simultaneously and inversely varying the resistances of the motor and generator field circuits.

10. The combination in a system of motor control of a dynamo electric generator driven at a substantially constant speed, a motor whose armature and field are energized by the generator, a separate substantially constant potential source of current for energizing the generator field, a rheostat for simultaneously and inversely varying the resistances of the motor and generator fields, and connections whereby the motor field is connected across the constant potential source and the generator in series for the lower speeds of the motor speed range and then connected directly across the generator for the higher motor speeds.

11. A system of motor control comprising a dynamo electric generator driven at a substantially constant speed, a motor whose armature and field are energized by the generator, a separate source of current of substantially constant potential for energizing the generator field and for supplementing the potential of the generator in the energization of the motor field throughout only the lower speeds of the motor speed range, and means for inversely varying the resistances of the generator and motor field circuits so as to vary the motor speed substantially directly in accordance with the variation of the potential of the generator.

12. The combination in a system of motor control of a dynamo electric generator driven at a substantially constant speed, a motor whose armature and field are energized by the generator, a separate substantially constant potential source of current for energizing the generator field, a rheostat for simultaneously and inversely varying the resistances of the motor and generator fields, and connections whereby the motor field is connected across the constant potential source and the generator in series for the lower speeds of the motor speed range and then connected directly across the generator for the higher motor speeds with the supply of energy to the motor field maintained during the transition.

In witness whereof, I have hereunto set my hand this 20th day of May, 1920.

HAROLD W. ROGERS.